United States Patent

Kosaka

[15] 3,683,515

[45] Aug. 15, 1972

[54] CROSS-TALK ELIMINATION SYSTEM FOR AN INSTRUCTIONAL TAPE RECORDER

[72] Inventor: Masahiro Kosaka, Osaka, Japan

[73] Assignee: Matsushita Electric Industrial Co., Ltd., Kadoma, Osaka, Japan

[22] Filed: Oct. 2, 1970

[21] Appl. No.: 77,404

[52] U.S. Cl. ..............................35/35 C, 179/100.2 K

[51] Int. Cl. ..........................G09b 19/04, G11b 5/44

[58] Field of Search.............179/100.2 K, 100.2 MD; 35/35 C

[56] References Cited

UNITED STATES PATENTS

| | | | |
|---|---|---|---|
| 3,342,952 | 9/1967 | Meyer | 179/100.2 MD |
| 2,713,676 | 7/1955 | Fleming | 179/100.2 K |
| 2,727,096 | 12/1955 | Singer | 179/100.2 K |
| 2,986,608 | 5/1961 | Pettus et al. | 179/100.2 K |

FOREIGN PATENTS OR APPLICATIONS

| | | | |
|---|---|---|---|
| 1,116,295 | 5/1956 | France | 179/100.2 K |

*Primary Examiner*—Bernard Konick
*Assistant Examiner*—Robert S. Tupper
*Attorney*—Wenderoth, Lind & Ponack

[57] ABSTRACT

A cross-talk elimination system for an instructional tape recorder comprises a recording and a reproducing means for recording and reproducing an instructional tape which has intermittently recorded thereon an instructional program and an oral response of a learner made to said instructional program. Said cross-talk elimination system has an electric network for reducing a leakage signal coupled to a magnetic reproducing head from a magnetic recording head either magnetically or electrostatically.

Said electrical network produces an electrical signal having the same amplitude and phase characteristics as said leakage signal.

Said electrical signal is coupled differentially to said leakage signal for reducing said leakage signal.

9 Claims, 13 Drawing Figures

Patented Aug. 15, 1972 3,683,515

4 Sheets-Sheet 1

INVENTOR
MASAHIRO KOSAKA

BY Wenderoth, Lind & Ponack
ATTORNEYS

INVENTOR
MASAHIRO KOSAKA

BY Wenderoth, Lind & Ponack
ATTORNEYS

INVENTOR
MASAHIRO KOSAKA

BY Wenderoth, Lind & Ponack
ATTORNEYS

INVENTOR
MASAHIRO KOSAKA

BY *Wenderoth, Lind & Ponack*
ATTORNEYS

CROSS-TALK ELIMINATION SYSTEM FOR AN INSTRUCTIONAL TAPE RECORDER

This invention relates generally to an instructional tape recorder, and more particularly to a cross-talk elimination system for such an instructional tape recorder for language study on which an instructional program and an oral response made to the instructional program can be recorded.

In learning a foreign language, it is considered to be quite useful for a learner to hear an instructional program repeatedly and to make oral responses to said instructional program.

And it is also quite effective for a learner to hear his recorded oral response compared with said instructional program after the termination of successive oral responses.

This repetitive hearing and speaking makes it possible for a learner to understand and grasp an instructional program and to form proper linguistic habits in a foreign language.

The tape recorder for language study referred to herein is one which has at least two recording and reproducing channels in order to record and reproduce said instructional program and said responses of the learner, respectively.

Generally an instructional program is recorded on a magnetic tape with intervals between two succeeding parts of the instructional program which, in practice, are composed of words or phrases.

When a learner studying a foreign language with such a tape recorder wishes to hear his oral response made during the time interval, he has to record his oral response with said tape recorder and reproduce this recorded oral response after the tape of said tape recorder is rewound, in order to compare his oral response with said instructional program for a better understanding of his response.

Said tape recorder for language study is hereinafter referred to as an instructional tape recorder.

Said instructional tape recorder having at least two recording and reproducing channels should have, consequently, at least two magnetic heads for each recording track.

When said two magnetic heads are separately placed relative to each other, any leakage signal from a magnetic recording head to a magnetic reproducing head is at a low enough level to not present a serious problem. On the other hand, however, when said two magnetic heads are placed adjacent to each other, a recording signal to said magnetic recording head couples to said magnetic reproducing head either magnetically or electrostatically.

The leakage signal mentioned above is a serious problem of said instructional tape recorder especially when a small cartridge magnetic tape is used, that is, where two magnetic heads cannot be placed separately to each other.

It is an object of the present invention to provide a cross-talk elimination system for an instructional a cross-talk elimination recorder having a low leakage signal level.

It is a further object of the present invention to provide an instructional tape recorder using a conventional stereo magnetic recording head.

These and other objects will become apparent from the following detailed description taken together with the accompanying drawings, wherein.

Before proceeding with a detailed description of the present invention, a language study system using an instructional tape recorder will be explained with reference to FIG. 1, which shows a schematic view of an instructional tape.

Figure 1:
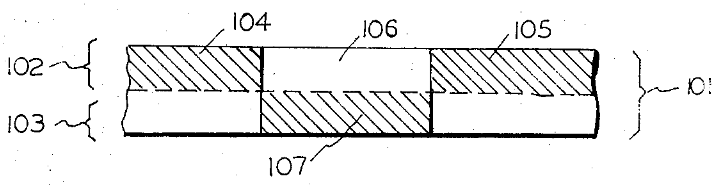
FIG. 1 is a schematic view of an instructional magnetic tape which has parts of instructional programs successively recorded thereon with moderate blank intervals therebetween to make it possible for learners to make their oral responses within the time of these blank intervals.

Referring now to the drawings, and more particularly to FIG. 1, an instructional tape 101 shown therein has two recording tracks 102 and 103 extending along the length thereof. Said recording track 102 has the parts 104 and 105 of an instructional program recorded successively thereon at suitable intervals 106 so as to enable a learner to finish his oral responses within this interval.

Said recording track 103 is supplied to make it possible for a learner to record his oral responses made to said instructional program onto intervals between successive instructional programs.

Said oral responses of a learner are recorded onto part 107 of said recording track 103 when said learner makes oral responses while hearing said instructional programs.

Thus, said instructional tape recorder for language study has at least two recording/reproducing channels for processing both said instructional program and said oral responses of a learner.

Said instructional tape recorder having an instructional program successively recorded on a magnetic tape is set to the following operation; one of said two recording/reproducing channels is set to a reproducing operation and the other of said two recording/reproducing channels is set to a recording operation, in order to make it possible for a learner to hear said instructional program reproduced from said magnetic tape and to record his oral responses on said magnetic tape.

Next, said two recording/reproducing channels of said instructional tape recorder are set to a reproducing operation after rewinding said magnetic tape at which time said instructional program and said oral response of said learner are recorded successively in different tracks, in order to compare said oral response with said instructional program.

Said recording/reproducing channels for processing said instructional program and said oral response of a learner are called hereinafter a program channel and a student channel, respectively, for the sake of simplicity of description.

Figure 2:
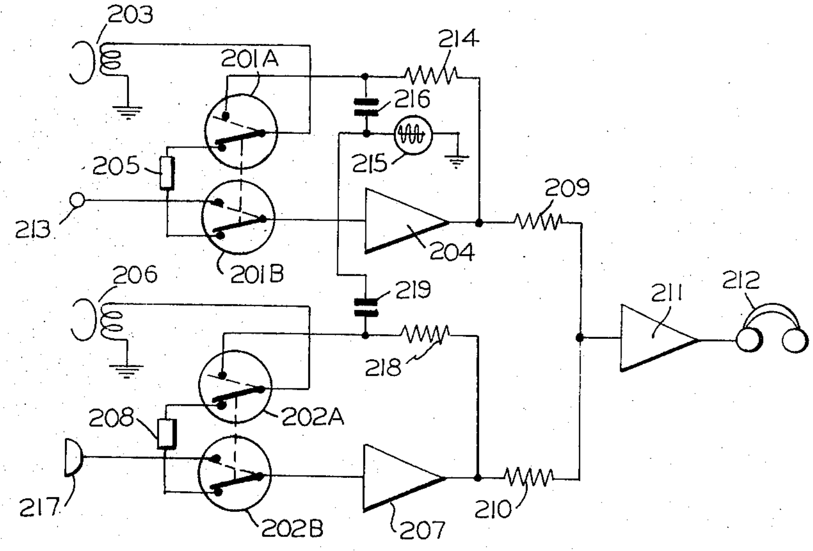
FIG. 2 is a schematic diagram of an electrical circuit of an instructional tape recorder.

Referring now to FIG. 2 where a schematic diagram of an electrical circuit of said instructional tape recorder having two recording/reproducing channels is shown, electrical switches 201A and 201B, and 202A and 202B are introduced to select a recording or reproducing operation of a program channel and a student channel, respectively.

The operation of said instructional tape recorder having an electrical circuit shown in FIG. 2 will be described hereinafter.

When both of said channels are switched to reproducing position as shown by the solid lines in FIG. 2, an instructional signal reproduced by a magnetic head 203 is fed to a program channel amplifier 204 of said program channel through said switches 201A and 201B, and a reproducing equalizer 205. On the other hand, a recorded oral response of a learner is reproduced by a magnetic head 206 and is fed to a student channel amplifier 207 through said switches 202A and 202B, and a reproducing equalizer 208. These two signals from said program channel amplifier 204 and said student channel amplifier 207 are coupled together by coupling resistors 209 and 210 and are fed to a monitor amplifier 211 and then to a headphone 212.

Therefore said learner can hear said instructional program and said recorded response simultaneously.

A recording of an instructional program and an oral response of a learner will be made when said switches 201A, 201B, 202A and 202B are switched to a recording position as shown by dashed lines in FIG. 2.

An instructional program source connected to a terminal 213 is fed to said magnetic head 203 through said switch 201B, said program channel amplifier 204, a recording resistor 214 and said switch 201A. A recording bias signal generated by a bias oscillator 215 is superimposed on the recording signal through a coupling capacitor 216. Said recording signal from said program channel amplifier 204 is fed to said headphone 212 in order to hear said recording signal during said recording operation.

An oral response of a learner picked up by a microphone 217 is fed to said magnetic head 206 through said switch 202B, said student channel amplifier 207, a recording resistor 218 and said switch 202A. Said recording bias signal is also superimposed on this recording signal through a coupling capacitor 219.

A serious problem involved in said instructional tape recorder described above is a leakage signal from said magnetic head 206 to said magnetic head 203 when said program channel and said student channel are operated in a reproducing operation and a recording operation, respectively. This is true since said magnetic head 203 can pick up a very weak magnetic field and said magnetic head 206 generates a strong magnetic field at its neighboring area.

Therefore said program channel amplifies said leakage signal of said learner's oral response as well as said reproduced instructional program simultaneously. These two kinds of oral response, one from said student amplifier 207 and the other from said program amplifier 204, are coupled by said coupling resistors 209 and 210. The two oral response signals are different from each other in the frequency characteristics of amplitude and phase.

Therefore the quality of said oral response of a learner in said monitor amplifier 211 is greatly deteriorated.

This problem becomes more serious when said two magnetic heads 203 and 206 are placed a short distance from each other, and this situation is very hard to overcome when a cartridge type magnetic tape is used.

Figure 3:
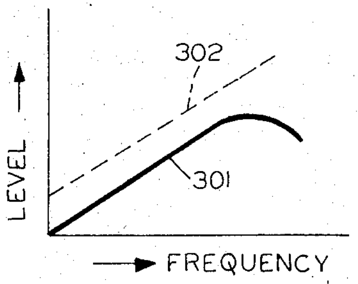
FIG. 3 is a diagram showing frequency characteristic curves of a leakage signal level and a reproduced signal level of a magnetic reproducing head.

Referring now to FIG. 3, the reproducing characteristics of a magnetic head and leakage signal characteristics are shown in a solid line curve 301 and a dashed line curve 302, respectively.

Figure 4:
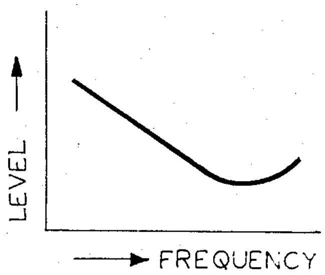
FIG. 4 is a diagram showing a frequency characteristic curve of an equalizer used in a reproducing circuit.

These curves show that the level of said reproducing signal and said leakage signal increase in proportion to an increase of frequency. Therefore, a reproducing equalizer having frequency characteristics as shown in FIG. 4 should be introduced in order to obtain a reproducing characteristic flat with respect to frequency.

Said leakage signal level differs as a function of the distance between one magnetic recording head and the other or by the condition of magnetic shielding of the magnetic heads.

Figure 5:
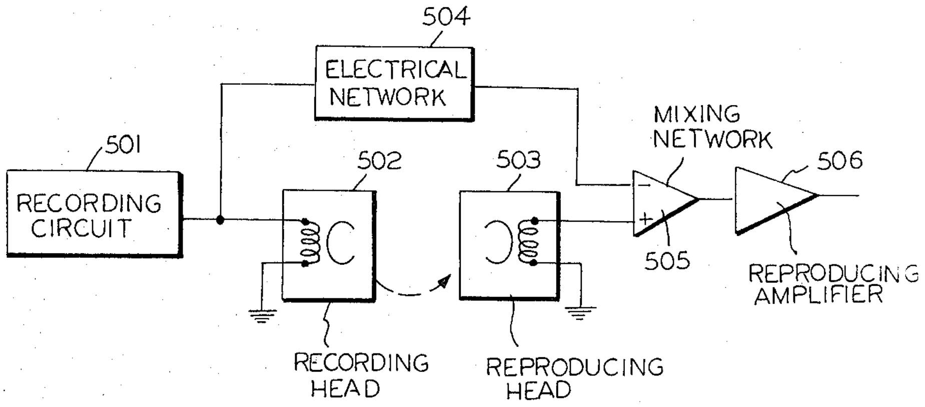
FIG. 5 is a schematic diagram of an electrical circuit for reducing a leakage signal based on a principle of the invention.

Referring now to FIG. 5, a schematic diagram of a cross-talk elimination system using an electrical network of the present invention for reducing the level of said leakage signal is shown.

A recording signal from a recording circuit 501 is fed to a magnetic recording head 502. A magnetic reproducing head 503 picks up said recording signal by way of magnetic coupling.

As previously described, this leakage signal may be cancelled by an electric signal having the same amplitude and phase characteristics of said leakage signal.

Said electrical signal for reducing said leakage signal is made through a electrical network 504 from said recording signal to said magnetic recording head 502. Said electrical network 504 has electrical transfer characteristics similar to those between said magnetic recording head 502 and said magnetic reproducing head 503 in order to provide an electrical signal the same amplitude and phase characteristics as said leakage signal.

Said leakage signal and said electrical signal are mixed together differentially by a mixing network 505 and are supplied to a reproducing amplifier 506.

The electrical transfer characteristics between said magnetic recording head 502 and said magnetic reproducing head 503 are analyzed briefly hereinafter in order to make said electrical network have electrical transfer characteristics appropriate for reducing said leakage signal.

Figure 6:
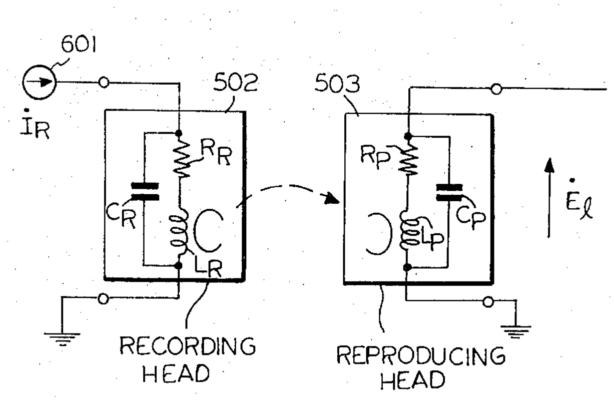
FIG. 6 is a schematic diagram of equivalent circuits of a magnetic recording head and a magnetic reproducing head.

Referring now to FIG. 6 where a simplified equivalent network of said magnetic recording head 502 and said magnetic reproducing head 503 is shown, a recording signal of a constant current source 601 flows to said magnetic recording head 502 having a winding resistance $R_R$, a winding inductance $L_R$ and a parallel capacitance $C_R$. A magnetic leakage flux made by said magnetic recording head 502 couples to said magnetic reproducing head 503 having a winding resistance $R_P$, a winding inductance $L_P$ and a parallel capacitance $C_P$.

A leakage signal $\dot{E}l$ will be described as follows in a medium frequency range where said parallel capacitances $C_R$ and $C_P$, and said winding resistances $R_R$ and $R_P$ are less effective.

$$\dot{E}l \cong jk\omega L_R L_P \dot{I}_R$$

where

*k*; coupling coefficient between said magnetic recording head and said magnetic reproducing head.

ω; angular operating frequency

Said leakage signal $\dot{E}l$, therefore, increases in amplitude in proportional to said angular frequency ω and a recording current $\dot{I}_R$, and is 90° phase leading.

The essence of the present invention, consequently, is a manner for producing an electric signal having a character similar to that of said $\dot{E}l$.

Figure 7:
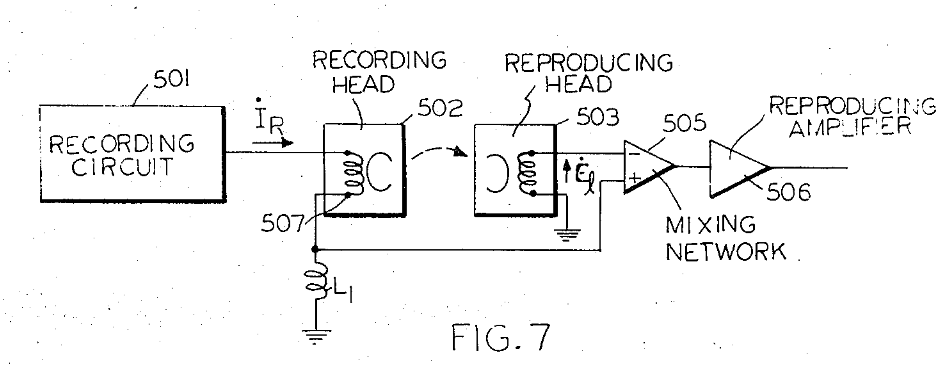
FIGS. 7, 8, 9, 10, 11 and 12 are schematic diagrams of electrical circuits of preferred embodiments of the invention.

Referring to FIG. 7 where a preferred embodiment of the present invention is shown, an inductor $L_1$ is connected between a return terminal 507 of said magnetic recording head 502 and ground.

Said recording current $\dot{I}_R$ flows to said inductor $L_1$ through said magnetic recording head 502 and produces an electric signal having a character similar to said $\dot{E}l$.

The inductance value of said inductor $L_1$ can be much smaller than that of said magnetic recording head 502 because the equation $L_1 = kL_R L_P$ should be satisfied where the value of *k* will be small for a better reduction of said leakage signal.

Then, said electric signal generated at said inductor $L_1$ is superimposed differentially to said leakage signal $\dot{E}l$ by said mixing network 505.

Experiments have proved that a reduction of said leakage signal by 20 dB or more can thus be easily attained.

Figure 8:
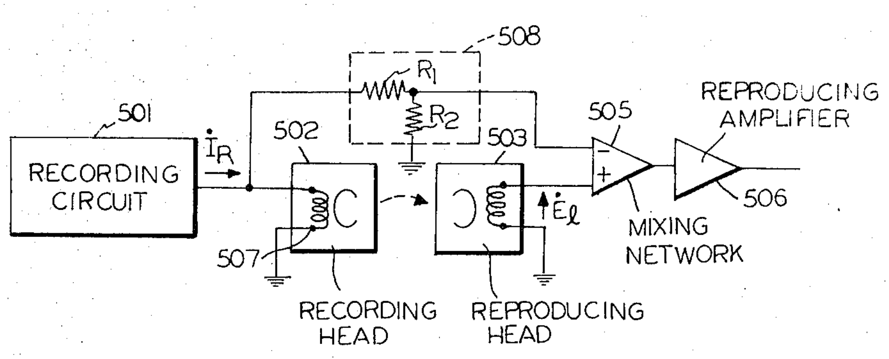

Referring now to FIG. 8 where another preferred embodiment of the present invention is shown, said winding inductance of said magnetic recording head 502 is used instead of said inductor $L_1$ for obtaining said electric signal for reducing said leakage signal $\dot{E}l$. Said electric signal between said magnetic recording head 502 is mixed with said leakage signal $\dot{E}l$ through an attenuating network 508 consisting of resistors $R_1$ and $R_2$. The reduction of said leakage signal *El* is done in a manner similar to that explained with reference to FIG. 7.

Figure 9:
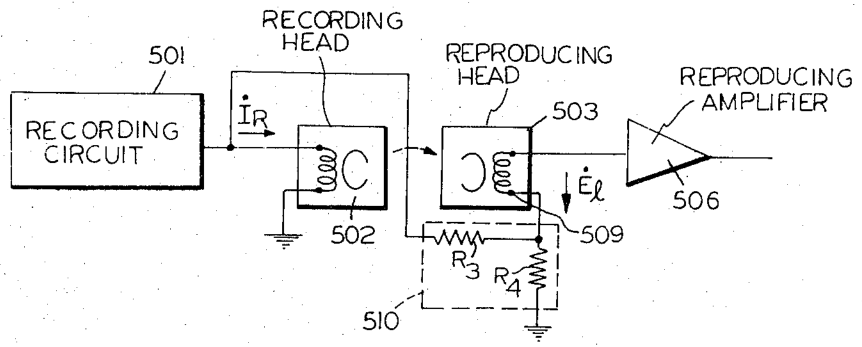

Referring to FIG. 9 where another preferred embodiment of the present invention is shown, said electric signal is taken between said magnetic recording head 502, and is superimposed on said leakage signal $\dot{E}l$ at said magnetic reproducing head 503 without using said mixing network.

Said electric signal is connected to a return terminal 509 of said magnetic reproducing head 503 through an attenuation network 510 consisting of resistors $R_3$ and $R_4$. In this case, however, electrical connection of said magnetic reproducing head 503 is interchanged to have said leakage signal $\dot{E}l$ in an opposite phase to said electric signal from said attenuation network 510.

Figure 10:
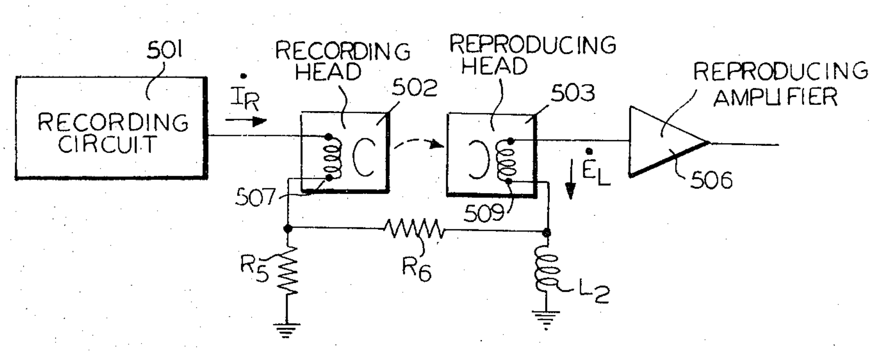

Referring to FIG. 10 where another preferred embodiment of the present invention is shown, an inductor $L_2$ is connected between a return terminal 509 of said magnetic reproducing head 503 and a ground. An electric current flows to said inductor $L_2$ for obtaining said electric signal to reduce the amount of said leakage signal $\dot{E}l$.

Said electric current to said inductor $L_2$ is proportional to said recording current $\dot{I}_R$ because said recording current $\dot{I}_R$ produces to a voltage supplied to said inductor through a resistor $R_6$ which has higher resistance value than the reactance value of said inductor $L_2$ at the operating frequency range.

Figure 11:
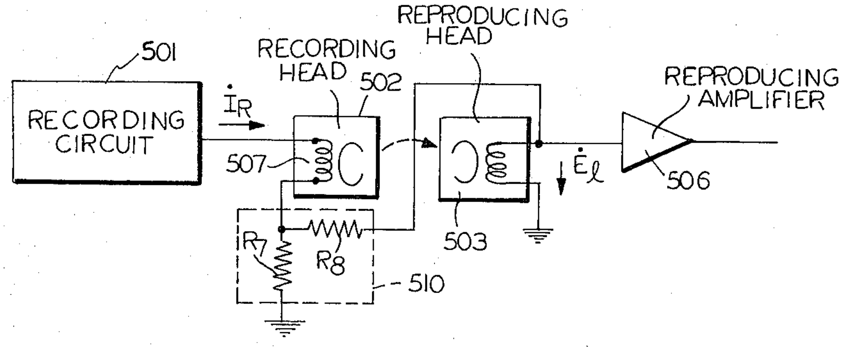

Referring now to FIG. 11 where another preferred embodiment of the present invention is shown, said winding inductance of said magnetic reproducing head 503 is used instead of said inductor $L_2$ for obtaining said electric signal for reducing said leakage signal $\dot{E}l$. An electric current proportional to said recording current $\dot{I}_R$ flows to an inductance of said magnetic reproducing head 503 through a electrical network 510 consisting of resistors $R_7$ and $R_8$ in order to obtain said electrical signal for reducing said leakage signal $\dot{E}l$ in a way similar to that explained with reference to FIG. 10.

Figure 12:
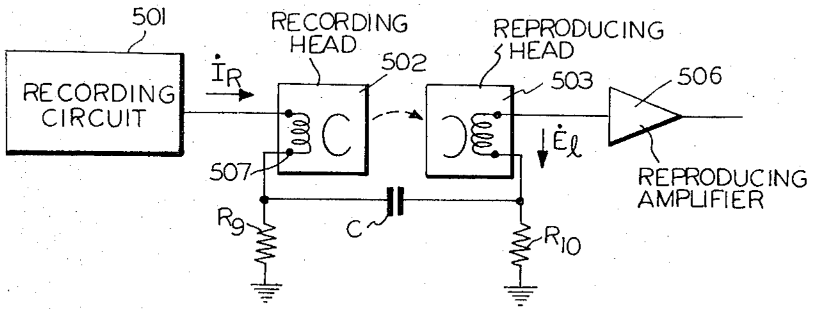

Referring to FIG. 12 where another preferred embodiment of the present invention is shown, an electric capacitor C will take an important role, in this case, in producing said electrical signal for reducing said leakage signal $\dot{E}l$ differently from those explained hereinbefore where an inductance takes said role. When the resistance value of a resistor $R_9$ is low in comparison with the reactance value of said electric capacitor C, a voltage value $\dot{E}_R$ across said resistor $R_9$ described by the equation $\dot{E}_R = R_9 \dot{I}_R$ is formed.

A voltage value $\dot{E}c$ is generated across a resistor $R_{10}$ according to the equation $\dot{E}c = j\omega CR_{10}\dot{E}_R = j\omega CR_9 R_{10}\dot{I}_R$ when the resistance value of said resistor $R_{10}$ is low in comparison with the reactance value of said electric capacitor *C*.

Consequently the equation of $\dot{E}c$ is similar to that of the equation of $\dot{E}l$ which has been described previously. These two signals $\dot{E}c$ and $\dot{E}l$ can be mixed together for reduction of said leakage signal $\dot{E}l$.

Said leakage signal from said magnetic recording head and said magnetic reproducing head will be successfully reduced by using said electric signal having the characteristics defined previously.

In addition to the preferred embodiments described hereinbefore, an electrical network consisting of electric capacitors, inductors and/or resistors can be introduced to an electrical network for obtaining said electrical signal, for the purpose of changing the phase or amplitude characteristics of said electrical signal.

The level of said leakage signal will become very high when said magnetic recording head is placed very close to said magnetic reproducing head. And said leakage signal level can not be reduced to a sufficiently low level even when said electric signal of the present invention is used.

Said leakage signal level, however, can be set at the same level as that of the reproducing signal level in said magnetic reproducing head.

A pair of magnetic heads having characteristics as described above can be used in a way explained hereinafter.

Figure 13:
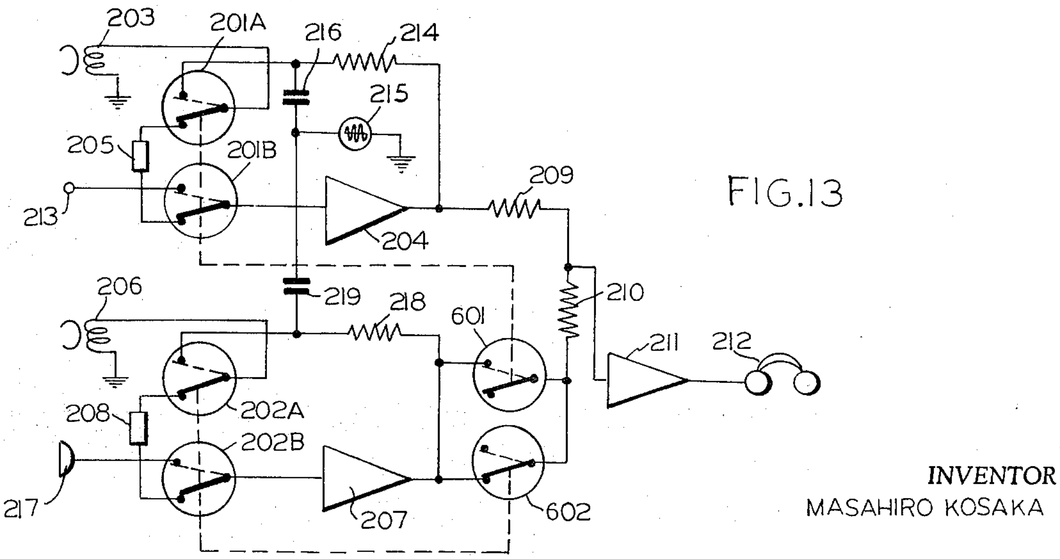
FIG. 13 is a schematic diagram of an electrical circuit of a preferred embodiment of the invention.

Referring now to FIG. 13 where another preferred embodiment of the instructional tape recorder of the invention is shown, electrical switches 601 and 602 are introduced in addition to the circuit diagram described previously with reference to FIG. 2. Said electrical switches 601 and 602 are operated simultaneously with said electrical switches 201A and 201B, and 202A and 202B, respectively.

The operation of the instructional tape recorder having an electrical circuit shown in FIG. 13 is similar to that explained previously with reference to FIG. 2 except in a condition in which said program channel and said student channel are in a reproducing condition and in a recording condition, respectively.

When said electrical switches 201A, 201B and 601 of said program channel are switched to the reproducing positions as shown in solid lines and, on the other hand, said electrical switches 202A, 202B and 602 of said student channel are switched to the recording positions as shown in dashed lines, an utterance signal of a learner from said microphone 217 does not flow into said monitor amplifier 211 through said mixing resistor 210 because the connections of said electrical switches 601 and 602 are open.

Although said utterance signal is blocked by said electrical switches 601 and 602, said learner can hear said utterance signal by means of leakage coupling from said magnetic recording head 206 to said magnetic reproducing head 203.

Therefore, one can use a pair of magnetic heads having a high leakage coupling level by applying a technique based on the present invention in which one can reduce said high leakage coupling level to the level of the reproducing signal of said instructional program.

As described herein before in various preferred embodiments, the essence of the present invention involves means whereby a leakage signal between a pair of magnetic heads is cancelled by an electric signal having the same frequency characteristics of both amplitude and phase.

Although preferred embodiments of the invention have been set forth in detail, it is desired to emphasize that they are not intended to be exhaustive or neccessarily limitative; on the contrary, the disclosure herein is set forth for the purpose of illustrating the invention and thus to enable others skilled in the art to adapt the invention in such ways as meet the requirements of particular applications, it being understood that various modifications can be made without departing from the scope of the invention.

What is claimed is:

1. A cross-talk elimination system for an instructional tape recorder, comprising, in combination, a magnetic tape having first and second recording tracks thereon; a program channel having a first magnetic recording/reproducing head and a first recording/reproducing circuit for recording/reproducing an instructional program onto said first recording track of said magnetic tape; a student channel having a second magnetic recording/reproducing head and a second recording/reproducing circuit for recording/reproducing a learner's oral signal onto said second recording track of said magnetic tape; a coupling network means for coupling signals from said program channel with signals from said student channel; a monitor amplifier means for amplifying a signal from said coupling network means and for driving a headphone or a loudspeaker in order to make it possible for said learner to hear said instructional program and said learner's signal simultaneously; an electrical network means connected to said second magnetic recording/reproducing head for producing a compensating electric signal having the same amplitude and phase as a leakage signal appear across a winding of said first magnetic recording/reproducing head at a reproducing mode when said second magnetic recording/reproducing head is at a recording mode; and a mixing network means connected between said electrical network means and said first magnetic recording/reproducing head for combining differentially said compensating electric signal with an electric signal appearing across a winding of said first magnetic recording/reproducing head in order to reduce the amplitude of said leakage signal when said first magnetic recording/reproducing head and said second magnetic recording/reproducing head are at a reproducing mode and a recording mode, respectively.

2. A cross-talk elimination system for an instructional tape recorder as claimed in claim 1, wherein said electrical network means and said mixing network means are combined into one circuit which comprises a first resistor inserted between a return terminal of said second magnetic recording/reproducing head and ground, a second resistor inserted between a return terminal of said first magnetic recording/reproducing head and ground, and a capacitor connected between said first resistor and said second resistor.

3. A cross-talk elimination system for an instructional tape recorder as claimed in claim 1, wherein said coupling network means has electrical switches which disconnect an electrical signal from said student channel to said monitor amplifier means when said program channel and said student channel are in a reproducing operation and in a recording operation, respectively.

4. A cross-talk elimination system for an instructional tape recorder as claimed in claim 1, wherein an inductance is inserted between a return terminal of said first magnetic recording/reproducing head and ground, said inductance generating said compensating electric signal when an electric current proportional to a recording current of said second magnetic recording/reproducing head at a recording mode flows through said inductance.

5. A cross-talk elimination system for an instructional tape recorder as claimed in claim 4, wherein said electric current proportional to a recording current is derived by a resistance network consisting of two resistors, one of which is connected between a return terminal of said second magnetic recording/reproducing head and ground, and the other of which is connected between said return terminal of said second magnetic recording/reproducing head and a return terminal of said first magnetic recording/reproducing head.

6. A cross-talk elimination system for an instructional tape recorder as claimed in claim 4, wherein said inductance is provided by a winding of said first magnetic recording/reproducing head.

7. A cross-talk elimination system for an instructional tape recorder as claimed in claim 1, wherein an inductance is inserted between a return terminal of said second magnetic recording/reproducing head and ground in order to obtain said compensating electric signal.

8. A cross-talk elimination system for an instructional tape recorder as claimed in claim 7, wherein said inductance is provided by a winding of said second magnetic recording/reproducing head in order to obtain said compensating electric signal, said compensating electric signal being connected to said mixing network means through a resistance network.

9. A cross-talk elimination system for an instructional tape recorder as claimed in claim 8, wherein said resistance network consists essentially of at least two resistors.

* * * * *